(12) United States Patent
Kalauch

(10) Patent No.: US 9,464,603 B2
(45) Date of Patent: Oct. 11, 2016

(54) MOTOR VEHICLE

(71) Applicant: AUDI AG, Ingolstadt (DE)

(72) Inventor: Gerd Kalauch, Oberndorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/026,172

(22) PCT Filed: Sep. 23, 2014

(86) PCT No.: PCT/EP2014/002574
§ 371 (c)(1),
(2) Date: Mar. 30, 2016

(87) PCT Pub. No.: WO2015/049036
PCT Pub. Date: Apr. 9, 2015

(65) Prior Publication Data
US 2016/0222927 A1    Aug. 4, 2016

(30) Foreign Application Priority Data

Oct. 4, 2013    (DE) .................. 10 2013 016 578

(51) Int. Cl.
| | | |
|---|---|---|
| *B60K 13/02* | (2006.01) | |
| *F02M 35/024* | (2006.01) | |
| *B60R 21/34* | (2011.01) | |
| *B62D 25/10* | (2006.01) | |
| *F02M 35/10* | (2006.01) | |
| *F02M 35/104* | (2006.01) | |

(52) U.S. Cl.
CPC ........ *F02M 35/02466* (2013.01); *B60K 13/02* (2013.01); *B60R 21/34* (2013.01); *B62D 25/105* (2013.01); *F02M 35/104* (2013.01); *F02M 35/10144* (2013.01); *B60R 2021/343* (2013.01)

(58) Field of Classification Search
CPC ................ F02M 35/02466; F02M 35/10091; F02M 35/10144; F02M 35/104; B60K 13/02; B60R 21/34; B60R 2021/343; B62D 25/10; B62D 25/105; B62D 25/12
USPC ............ 180/68.1, 68.2, 68.3, 69.2, 274, 281
See application file for complete search history.

(56) References Cited

U.S. PATENT DOCUMENTS

| 6,553,953 B1 | 4/2003 | Fujihara et al. |
|---|---|---|
| 6,622,680 B2 * | 9/2003 | Kino .................. B29C 65/2015 123/184.21 |
| 2003/0062013 A1 | 4/2003 | Kino et al. |

(Continued)

FOREIGN PATENT DOCUMENTS

| DE | 3536379 A1 | 4/1987 |
|---|---|---|
| DE | 100 28 856 A1 | 1/2002 |
| DE | 103 39 614 A1 | 3/2005 |

(Continued)

OTHER PUBLICATIONS

International Search Report issued by the European Patent Office in International Application PCT/EP2014/002574.

*Primary Examiner* — John Walters
(74) *Attorney, Agent, or Firm* — Henry M. Feiereisen LLC

(57) ABSTRACT

A motor vehicle has an engine compartment which can be closed by at least one hood, and in which there is an air intake line that can be indirectly or directly fluidically connected to an intake manifold of an internal combustion engine. The air intake line includes a fiber composite element made of an air-permeable fiber composite material.

9 Claims, 2 Drawing Sheets

(56) References Cited

U.S. PATENT DOCUMENTS

2004/0226772 A1 11/2004 Hirose et al.
2005/0215191 A1* 9/2005 Kino .................. B60K 13/02
454/143

FOREIGN PATENT DOCUMENTS

| DE | 10 2004 032 597 A1 | 2/2006 |
|----|---|---|
| DE | 10 2008 033 802 A1 | 1/2010 |
| DE | 10 2009 033 897 A1 | 1/2011 |
| EP | 1 614 590 A2 | 1/2006 |
| EP | 2 165 068 B1 | 3/2010 |
| FR | 2 811 940 A1 | 1/2002 |
| FR | 2 886 892 A1 | 12/2006 |
| FR | 2 921 308 A3 | 3/2009 |
| JP | H02 158419 A | 6/1990 |
| JP | H11 343938 A | 12/1999 |

* cited by examiner

MOTOR VEHICLE

CROSS-REFERENCES TO RELATED APPLICATIONS

This application is the U.S. National Stage of International Application No. PCT/EP2014/002574, filed Sep. 23, 2014, which designated the United States and has been published as International Publication No. WO 2015/049036 and which claims the priority of German Patent Application, Serial No. 10 2013 016 578.4, filed Oct. 4, 2013, pursuant to 35 U.S.C. 119(a)-(d).

BACKGROUND OF THE INVENTION

The invention relates to a motor vehicle with an engine compartment which can be closed by means of a hood, and in which an air intake line is arranged which can be directly or indirectly fluidly connected to an intake manifold of an internal combustion engine.

The motor vehicle has an engine compartment, in which at least one drive aggregate of the motor vehicle, i.e., for example the internal combustion engine, is arranged. A hood is assigned to the engine compartment, which serves for closing the engine compartment at least toward one direction or delimit the engine compartment in this direction against an outer environment of the motor vehicle. The hood can for example be arranged at least in an open position and in a closed position, wherein in the open position the engine compartment is accessible from the surrounding environment of the motor vehicle. In the closed position on the other hand, the hood is intended to cover the engine compartment at least partially.

The internal combustion engine, which can be arranged in the engine compartment, has an air intake device, wherein the intake manifold is a part of this air intake device. In the intake manifold for example a throttle of the internal combustion engine is arranged. Fluidly connected or connectable to the intake manifold is the air intake line. Via the air intake line air, in particular fresh air, can thus be supplied to the intake manifold and correspondingly to the internal combustion engine from the external environment of the motor vehicle. The air intake line extends for example from an intake opening up to an outlet opening. The outlet opening is hereby connectable or connected to the intake manifold of the internal combustion engine, in particular directly or indirectly, for example via an air filter of the air intake device. The outlet opening is arranged spaced apart from the inlet opening, in particular the outlet opening is positioned further frontward in driving direction of the motor vehicle.

The air intake line and the air filter are particularly important with regard to a pedestrian protection because they are oftentimes arranged on the side of the internal combustion engine which faces the hood. From EP 2 165 068 B1 an impact damper of a motor vehicle is known for forming a pedestrian protection. This impact damper includes a yielding energy-absorbing damper material, wherein the damper material surrounds parts of the air intake system of the motor vehicle at least in an impact direction which is perpendicular to the outer panel.

Also known from the state of the art is patent document DE 10 2009 033 897 A1. This reference describes a motor vehicle drive aggregate, which includes an internal combustion engine, an air filter and an air flow channel extending between the air filter and the internal combustion engine. The air flow channel includes at least in sections a radially inner air-permeable sound absorption region which is open towards the air flow in the air flow channel, which sound absorption region is made of a fiber-containing material and a radially outer air-impermeable barrier layer. Further known from the state of the art are the Patent documents DE 10 2004 042 597 A1, DE 103 39 614 A1, DE 10 2008 033 802 A1 and DE 35 36 379 A1.

SUMMARY OF THE INVENTION

It is an object of the invention to propose a motor vehicle which has an air intake line, which has improved properties, in particular regarding pedestrian protection and/or the acoustic of the motor vehicle.

According to the invention this is achieved with a motor vehicle with the features of the independent claim. Hereby it is provided that the air intake line has a fiber composite element made of an air-permeable fiber composite material, wherein along the air intake line air can enter through the fiber composite element into the air conducting internal space of the air intake line so that in case of a blocked inlet opening air can exit through the outlet line.

Aspirated air can flow through the air intake line, wherein the air flow in particular occurs in an air-conducting internal space of the air intake line. Hereby the fiber composite element can for example engage around at least regions of the internal space of the air intake line or around the entire internal space of the air intake line. Viewed in cross section—relative to the longitudinal center axis of the air intake line—the fiber composite material therefore preferably encloses at least portions of the air-conducting internal space of the air intake line, in particular completely engages around or encloses it, and insofar contributes to forming the air intake line. The fiber composite element is hereby—again viewed in cross section—located between the internal space of the air intake line and the environment or the engine compartment.

The fiber composite material is permeable for air, i.e., it dos in particular not seal the internal space completely against the outer environment or the engine compartment. However the fiber composite material preferably has a degree of permeability which ensures that at least a predominant portion of the air which exits from the outlet opening, in particular the entire air exiting from the air outlet opening, reaches the internal space via the inlet opening. It is also preferred that no air or at most a small proportion of the air exiting through the outlet opening reaches the internal space through the fiber composite material. The air permeability is for example realized by selecting a porous fiber composite material.

The air permeability has the advantage that air can exit through the outlet opening also when the inlet opening is blocked because the air can enter through the fiber composite element into the internal space along the air intake line. Such a blocking of the inlet opening may in particular be caused by external influences, for example snowfall or the like.

The configuration of the fiber composite element from fiber composite material has several advantages. On one hand the fiber composite element formed in this way is easily formable so that in case of a collision on the hood or in case of a deformation of the hood the air intake line or the fiber composite element can yield without problems as soon as the hood contacts the air intake line and impinges on the air intake line with a corresponding force. Hence, a thusly deformable fiber composite element can significantly contribute to pedestrian protection. At the same time the fiber composite element has a dimensional stability so as to retain at least to the most part, in particular completely its shape also in the presence of an operating pressure in the internal space. The operating pressure is usually loser than the ambient pressure, i.e., it is a negative pressure. In addition the fiber composite material has a sound blocking and/or sound damping effect, so that in addition or alternatively the acoustic of the motor vehicle is improved.

The fiber composite material is for example a fiber nonwoven composite material. The term fiber nonwoven means a nonwoven textile made of fibers which are held together by fiber adhesion. In case of the fiber nonwoven composite material, such a fiber nonwoven is used as fiber portion of the fiber composite material. Beside the fiber proportion the fiber composite material has a matrix, which is for example present in the form of a plastic, in particular a thermoplastic, a thermosetting plastic or an elastomer.

Particularly preferably the air intake line has a sealing at its inlet opening and/or its outlet opening, for example in the form of a sealing ring, which preferably completely surrounds the respective opening in circumferential direction. The sealing can be fastened on the fiber composite element, in particular molded on the fiber composite element and thus be integral with the fiber composite element.

A further embodiment of the invention provides that the fiber composite element has an internal coating on a side which faces an air-conducting internal space of the air intake line and/or an outer coating on a side which faces away from the internal space. By means of the inner coating or the outer coating the air permeability or the degree of permeability of the fiber composite element can be adjusted to the desired value. The inner coating or the outer coating is thus present in the form of an airtight coating or an at least partially airtight coating.

In a refinement of the invention the inner coating and/or the outer coating is/are configured as a film. The term film means a thin coating element which can generally be made of any material. For example a plastic film or a metal foil is used. The thickness of the foil is selected so that the foil can be easily deformed in case of a force acting on it, in particular for example in the case of a impact on the hood.

By means of the inner coating or the outer coating the degree of permeability can be adjusted without adversely affecting the advantageous properties regarding pedestrian protection and/or the acoustic. Preferably the fiber composite element is provided with the inner coating or the outer coating over its entire surface. Alternatively of course only a region of the outer surface of the fiber composite element can be provided with the outer coating and/or only a region of the inner surface of the fiber composite element can be provide with the inner coating.

In a further advantageous embodiment of the invention the fiber composite element is present as a core of a fiber composite arrangement. The term fiber composite arrangement means a multilayer arrangement whose core is formed by the fiber composite element. The fiber composite element or the core is thus a layer of the fiber composite arrangement. In particular this layer is an inner layer, which is connected on both sides with an outer layer. The outer layer or the outer layers can for example be configured analogous to the description above with regard to the outer coating or the film. The fiber composite arrangement is thus preferably produced in the manner of a sandwich construction, i.e., it is a sandwich-fiber composite arrangement.

In a further embodiment of the invention the air intake line is fastened on the hood. Due to this fastening the air intake line can be displaced together with the hood, in particular between the positions mentioned above, i.e., the open position and the closed position. Hereby it can be provided that the air intake device has a connection piece which is arranged in the motor compartment. The connection piece is for example assigned to the intake manifold or the air filter. The connection piece and the outlet opening of the air intake line are arranged so as to sealingly contact each other in the closed position of the hood, so that a fluid connection between the internal space of the air intake line and an internal space in the connection piece is realized. In case of displacement of the hood from the closed position the outlet opening of the air intake line is removed from the connection piece so that the (direct) fluid connection between them is interrupted.

The fastening of the air intake line on the hood has the advantage of increasing the available installation space in the engine compartment underneath the air intake line. Hereby it may be however that the air intake line is arranged in a deformation region, which serves for pedestrian protection. This deformation region serves for receiving the hood in case of a deformation due to an externally acting force, for example in the event of an accident. However, due to the configuration of the air intake line from the fiber composite material this is unproblematic because the air intake line easily releases the deformation region for the hood in the event of a deformation force.

The air intake line or at least the fiber composite element can be configured multi-part and can thus consist of a first subregion and a second subregion. These subregions are for example configured so that—when viewed in cross section—they enclose only regions of the internal space. When they are connected with each other they together define the internal space. Particularly preferably the subregions are fastened on each other in a materially bonding manner, in particular by welding. The subregions are hereby preferably fastened to each other so that a predetermined breaking point is present at the connection site of the subregions. The predetermined breaking point can be configured so that it breaks when a force acts on it such as in the event of a deformation of the hood, in particular in the event of an accident, so that the subregions are released for displacement relative to each other. This further improves pedestrian protection.

In a further embodiment of the invention at least one damper element is provided for fastening the air intake line. Preferably the air intake line is fastened via the at least one damper element, in particular exclusively via the at least one damper element. The fastening is accomplished for example on the hood or on a mount for the air intake line arranged fixedly on the engine compartment. The damper element is for example at least partially configured elastic which avoids transmission of vibrations from the air intake line to the hood or the mount and thus to further regions of the motor vehicle. As a result the acoustic of the motor vehicle can be further improved.

A refinement of the invention provides that the air intake line is arranged in a deformation region, which serves for pedestrian protection. The deformation region is for example situated under the hood in the engine compartment. The deformation region serves for receiving the hood in the event the hood is deformed in the direction of or into the deformation region under the influence of an external force. In order to ensure sufficient pedestrian protection it is therefore necessary to keep the deformation space free of components. However, due to the easy deformability of the air intake line according to the description above it is possible to arranged the air intake line in the deformation region without adversely affecting pedestrian protection of the motor vehicle. The air intake line can hereby be configured multi-part according to the description above.

An advantageous embodiment of the invention provides that the air intake line is at least in regions integrated in the hood. As explained above the air intake line can be fastened on the hood. In addition an integration in the hood is provided so that at least regions of the air intake line are arranged in the hood.

Hereby it can be provided that the hood has a support structure and an outer panel arranged on the support structure, wherein at least portions of the air intake line are arranged in the support structure and/or is formed by the outer panel and/or an attachment of the hood. The outer panel is fastened on the support structure and serves for covering the engine compartment so that a visually appealing impression of the motor vehicle is achieved. The support structure has for example a frame and preferably at least one reinforcement strut and serves for holding the outer panel in order to ensure the dimensional stability of the outer panel. The outer panel and also the support structure are however preferably configured so as to be deformable in the event of an external force as for example caused by an accident. Hereby it is for example provided that the support structure and/or the outer panel can retreat into the deformation region described above.

Within the scope of the above-described integration of the air intake line into the hood at least regions of the air intake line are arranged in the support structure. In addition or as an alternative at least regions of the air intake line can also be formed by the outer panel or the attachment. In this case the internal space is for example delimited on one side by the outer panel or the attachment. In this case it can be provided that the fiber composite element directly adjoins the outer panel or the attachment in order to also delimit the further sides of the internal space—viewed in cross section relative to the longitudinal center axis. The term attachment means a component, which is fastened on the support structure and is preferably spaced apart from the outer panel.

It can also be provided that the fiber composite element has a thermoplastic material as matrix, in particular the fiber composite element can be a LWRT material. As mentioned above generally different materials are suited for the matrix. However, particularly preferably a thermoplastic material is used. The fibers of the fiber composite material are embedded into the matrix. The fibers can hereby be present in any desired form, for example as nonwoven. The fibers can consist of any desired material. Preferably, however, glass fibers, carbon fibers, ceramic fibers, aramid fibers, steel fibers, nylon fibers or the like are used.

For example a LWRT-material is used as fiber composite material, wherein FWRT stands for Light-Weight Reinforced Thermoplastics.

BRIEF DESCRIPTION OF THE DRAWING

In the following the invention is explained in more detail by way of exemplary embodiments shown in the drawings without limiting the invention. Hereby it is shown in FIG. 1 a sectional view of a motor vehicle, wherein a engine compartment and a hood for closing the engine compartment are shown, and FIG. 2 a view of a support structure of the hood from below, wherein an air intake line at least portions of which are situated in the support structure, can be seen.

DETAILED DESCRIPTION OF PREFERRED EMBODIMENTS

Figure 1:
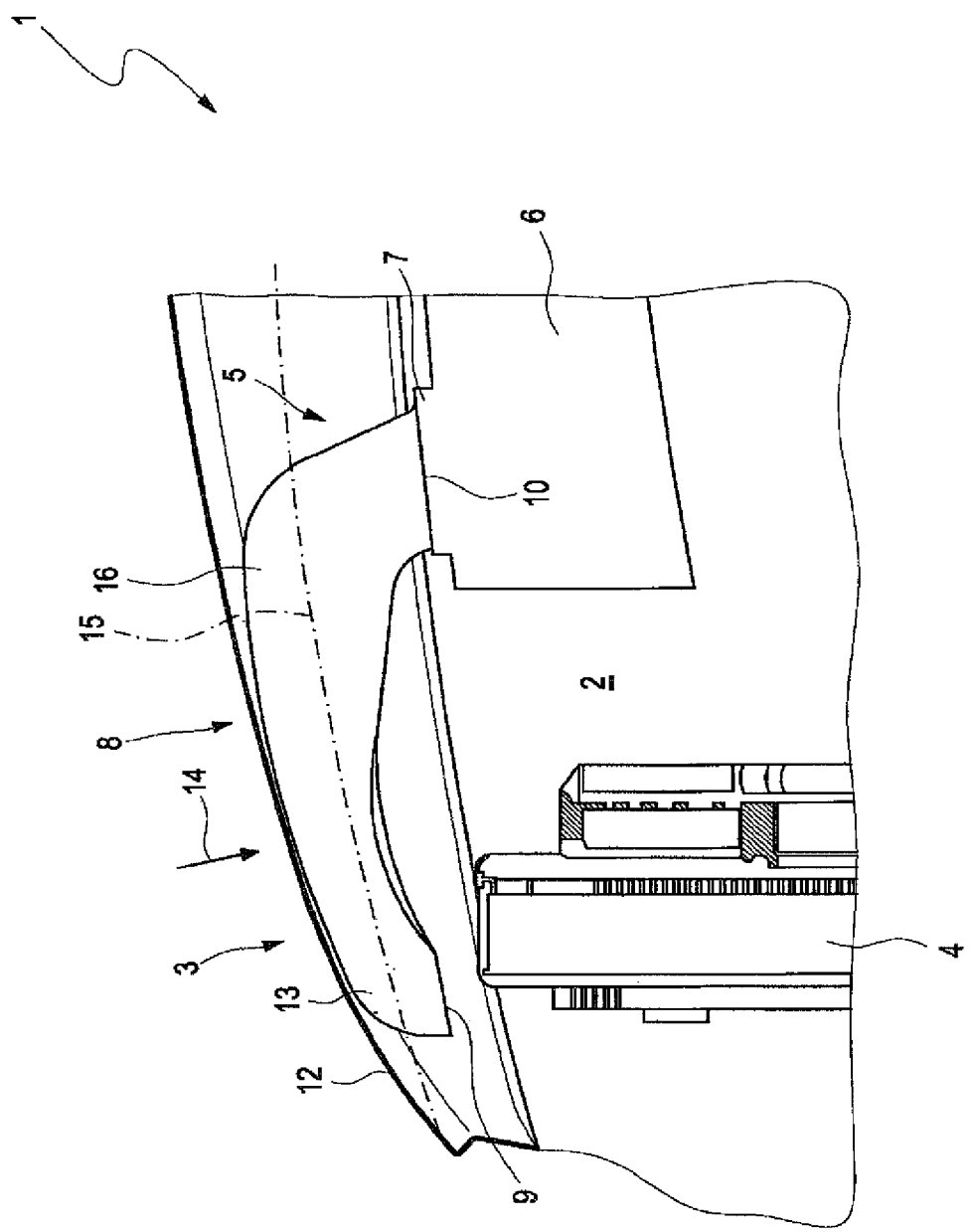

FIG. 1 shows a sectional side view of a region of a motor vehicle 1. Hereby in particular an engine compartment 2 and a hood 3, which delimits the engine compartment upwards are shown. In the engine compartment 2 at least portions of a radiator 4 are arranged. Also further aggregates of the motor vehicle 1 can be provided in the engine compartment 2. In particular a here not shown drive aggregate, for example an internal combustion engine, is provided in the engine compartment 2. For supplying the internal combustion engine with air, in particular fresh air, an air intake device 5 is provided, which has an air filter 6 with a here covered connection piece 7.

The air intake device 5 further has an air intake line 8. The air intake line 8 has an inlet opening 9 and an outlet opening 10. It is provided that the outlet opening 10 in a closed position of the hood 3 rests against the connection piece 7 in such a manner that a tight fluid connection between an internal space of the air intake line 8 and the flow channel of the connection piece 7 is established. At let portions of the intake opening 9, in particular the entire inlet opening, is for example arranged in driving direction or in longitudinal direction of the motor vehicle 1 in front of the radiator 4.

The hood 3 has a here not shown support structure 11 and an outer panel 12. In the engine compartment 2 a deformation region 13 is present into which the support structure 11 and/or the outer panel 12 can retreat, when an external force (arrow 14) acts on the hood 3. Such a force may for example result from an accident, in particular involving a pedestrian. The deformation region 13 thus serves for pedestrian protection because it permits a deformation of the hood 3. A delimiting line 15 signifies the regions above which preferably no rigid elements are arranged in order to permit this deformation into the deformation region 13.

It is however provided that at least regions of the air intake line 8 are arranged in this deformation region 13. This is made possible by a specific configuration of the air intake line 8. The air intake line has a fiber composite element 16 made of an air-permeable fiber composite material and is thus flexible. The fiber composite material 16 preferably surrounds or encloses the air-conducting internal space of the air intake line 8. On the side of the fiber composite element 16 which faces the internal space a here not recognizable inner coating is provided by means of which the air permeability or the degree of permeability of the air intake line 8 can be adjusted.

In addition the inner coating usually also has a smoother surface than the fiber composite material so that additionally flow resistances can be lowered by the air intake line 8. Correspondingly the pressure loss of the air intake line 8 is reduced. Preferably the inner coating is applied over the entire inner surface of the fiber composite element 16. As an alternative the fiber composite element 16 can of course also be a core of a fiber composite arrangement, which is for example configured as sandwich-fiber composite arrangement. Preferably a thermoplastic material is provided as matrix of the fiber composite material particularly.

Figure 2:
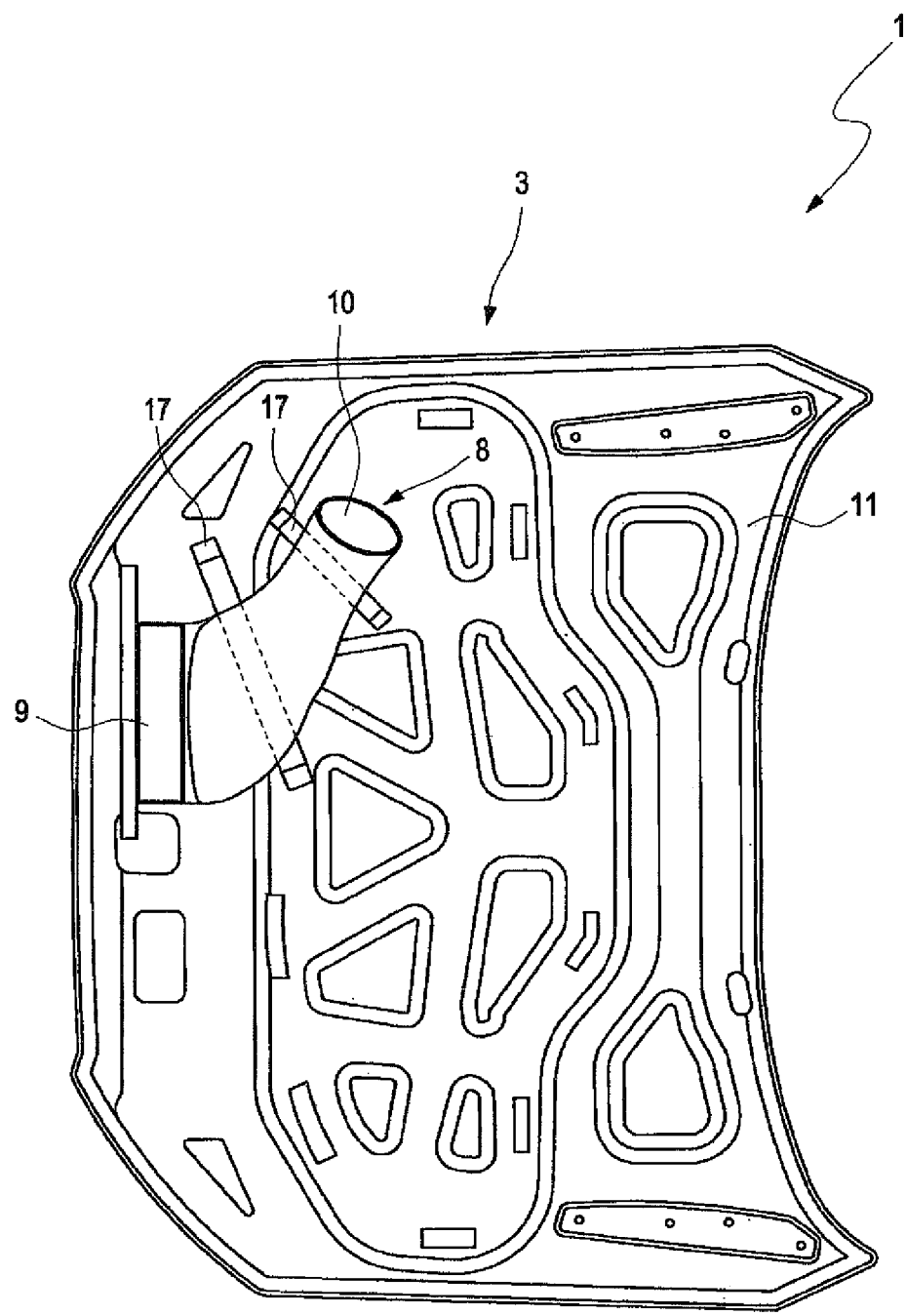

FIG. 2 shows the support structure 11 of the hood 3 in a view from below. It can clearly be recognized that the air intake line is fastened on the hood 3 or the support structure 11 by means of at least one fastening element 17 (here: two fastening elements 17). The at least one fastening element is hereby preferably configured as a damping element or has such a damping element. The damping element is configured so that vibrations of the air intake line 8 are not or only in strongly attenuated manner, transmitted to the hood 3 or the motor vehicle 1. In this way the acoustic of the motor vehicle 1 is significantly improved.

It can also be recognized that the air intake line 8 has the inlet opening 9 and the outlet opening 10. The thusly oriented outlet opening 10 ensures that the fluid connection to the connection piece 7, which is for example assigned to the air filter 6, is realized in the closed position of the hood 3.

LIST OF REFERENCE SIGNS

1 motor vehicle
2 engine compartment
3 hood
4 radiator
5 air intake device
6 air filter
7 connection piece
8 air intake line
9 inlet opening
10 outlet opening
11 support structure
12 outer panel
13 deformation region
14 arrow
15 delimiting line
16 fiber composite element
17 fastening element

What is claimed is:

1. A motor vehicle, comprising:
   a hood for closing an engine compartment of the motor vehicle, said hood having a deformation region for pedestrian protection;
   an air intake line arranged in the deformation region of the hood and having an inlet opening and an outlet opening, said air intake line being fluidly connected to an intake manifold of an internal combustion engine via an air filter, said air intake line comprising a fiber composite element made of an air-permeable fiber composite material which has a matrix made of thermoplastic material, said fiber composite element being configured to permit air flow through the fiber composite element into an air-conducting internal space of the air intake line along the air intake line, and out of the outlet opening also in case of blockage of the inlet opening; and
   a sealing arranged on the inlet opening or the outlet opening and fastened to the fiber composite element.

2. The motor vehicle of claim 1, wherein the fiber composite element has an inner coating on a side which faces the air-conducting internal space of the air intake line and/or an outer coating on a side which faces away from the internal space.

3. The motor vehicle of claim 2, wherein the inner coating and/or the outer coating is configured as a film.

4. The motor vehicle of claim 1, wherein the fiber composite element is configured as a core of a fiber composite arrangement.

5. The motor vehicle of claim 1, wherein the air intake line is fastened on the hood.

6. The motor vehicle of claim 1, further comprising at least one damping element for fastening the air intake line.

7. The motor vehicle of claim 1, wherein at least portions of the air intake line are integrated in the hood.

8. The motor vehicle of claim 1, wherein the hood has a support structure and an outer panel arranged on the support structure, wherein at least portions of the air intake line are arranged in the support structure.

9. The motor vehicle of claim 8, wherein the air intake line is formed by the outer panel and/or an attachment of the hood.

* * * * *